(12) United States Patent
Wiencke

(10) Patent No.: US 9,372,665 B2
(45) Date of Patent: Jun. 21, 2016

(54) METHOD AND APPARATUS FOR MULTIPLYING BINARY OPERANDS

(71) Applicant: Texas Instruments Incorporated, Dallas, TX (US)

(72) Inventor: Christian Wiencke, Oberschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 239 days.

(21) Appl. No.: 14/155,806

(22) Filed: Jan. 15, 2014

(65) Prior Publication Data

US 2014/0136588 A1  May 15, 2014

Related U.S. Application Data

(63) Continuation of application No. 12/266,315, filed on Nov. 6, 2008, now Pat. No. 8,667,043.

(30) Foreign Application Priority Data

Nov. 15, 2007   (DE) .......................... 10 2007 056 104

(51) Int. Cl.
  *G06F 7/53*  (2006.01)
  *G06F 7/523*  (2006.01)
(52) U.S. Cl.
  CPC .............. *G06F 7/523* (2013.01); *G06F 7/5306* (2013.01); *G06F 2207/382* (2013.01)
(58) Field of Classification Search
  None
  See application file for complete search history.

(56) References Cited

U.S. PATENT DOCUMENTS

| | | | | |
|---|---|---|---|---|
| 3,866,030 A | * | 2/1975 | Baugh | G06F 7/506 708/625 |
| 3,956,622 A | * | 5/1976 | Lyon | G06F 7/525 708/626 |
| 4,796,219 A | * | 1/1989 | Williams | G06F 7/525 708/626 |
| 5,181,184 A | * | 1/1993 | Shim | G06F 7/5306 708/625 |
| 5,473,559 A | * | 12/1995 | Makino | H03M 7/04 708/620 |
| 6,567,834 B1 | * | 5/2003 | Marshall | G06F 7/527 708/626 |
| 2004/0010536 A1 | * | 1/2004 | Moreno | G06F 7/53 708/625 |
| 2004/0024804 A1 | * | 2/2004 | Zeng | G06F 7/5318 708/620 |
| 2008/0243976 A1 | * | 10/2008 | Wiencke | G06F 7/5312 708/230 |

* cited by examiner

*Primary Examiner* — David H Malzahn
(74) *Attorney, Agent, or Firm* — Robert D. Marshall, Jr.; Frank D. Cimino

(57) ABSTRACT

Method and apparatus for multiplying a signed first operand na bits and a signed second operand nb bits, wherein na and nb are different positive integer numbers, the method comprising generating single bit products of pairs of a single bit from the signed first operand and a single bit from the signed second operand with a logical AND function to produce na times nb single bit products, selectively inverting for the signed first operand and the signed second operands the single bit products of the first operand bit na−1 multiplied with the second operand bits 0 to nb−2, selectively inverting the single bit products of the signed second operand bits 0 to na−2 multiplied with the signed second operand bit nb−1, after the step of inverting adding the single bit products in accordance with their respective order for producing an intermediate product, and adding a '1' bit value at bit positions nb−1, na−1 and na+nb−1 for receiving a final product.

4 Claims, 6 Drawing Sheets

METHOD AND APPARATUS FOR MULTIPLYING BINARY OPERANDS

CROSS-REFERENCE TO RELATED APPLICATIONS

This application is a Continuation of and claims priority to U.S. patent application Ser. No. 12/266,315, filed Nov. 6, 2008, now U.S. Pat. No. 8,667,043, which claims priority to claims benefit of German Patent Application No. 10 2007 056 104.2, filed Nov. 15, 2007. Said applications hereby incorporated in their entirety herein by reference.

BACKGROUND OF THE INVENTION

1. Field of the Invention

Embodiments of the present invention generally relate to a method and apparatus for multilpying binary operands relating to a data processing.

2. Description of the Related Art

The present invention relates to a method for multiplying binary operands and a corresponding multiply and a multiply and accumulate unit for digital data processing.

Digital data processing requires multiplication and accumulation of digital data. For this purpose, digital signal processors (DSP) usually include a multiply or a multiply and accumulate (MAC) unit, which is adapted to multiply and accumulate digital operands (i.e. binary numbers) for various controlling and data processing tasks.

As multiplication and accumulation of digital numbers is one of the basic and central data processing steps in all kinds of data processing applications, there is a general motivation to improve the multiply and accumulate units towards faster operation and less complexity.

SUMMARY OF THE INVENTION

Embodiments of the present invention relate to a method and apparatus for multiplying a signed first operand na bits and a signed second operand nb bits, wherein na and nb are different positive integer numbers, the method comprising generating single bit products of pairs of a single bit from the signed first operand and a single bit from the signed second operand with a logical AND function to produce na times nb single bit products, selectively inverting for the signed first operand and the signed second operands the single bit products of the first operand bit na−1 multiplied with the second operand bits 0 to nb−2, selectively inverting the single bit products of the signed second operand bits 0 to na−2 multiplied with the signed second operand bit nb−1, after the step of inverting adding the single bit products in accordance with their respective order for producing an intermediate product, and adding a '1' bit value at bit positions nb−1, na−1 and na+nb−1 for receiving a final product.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
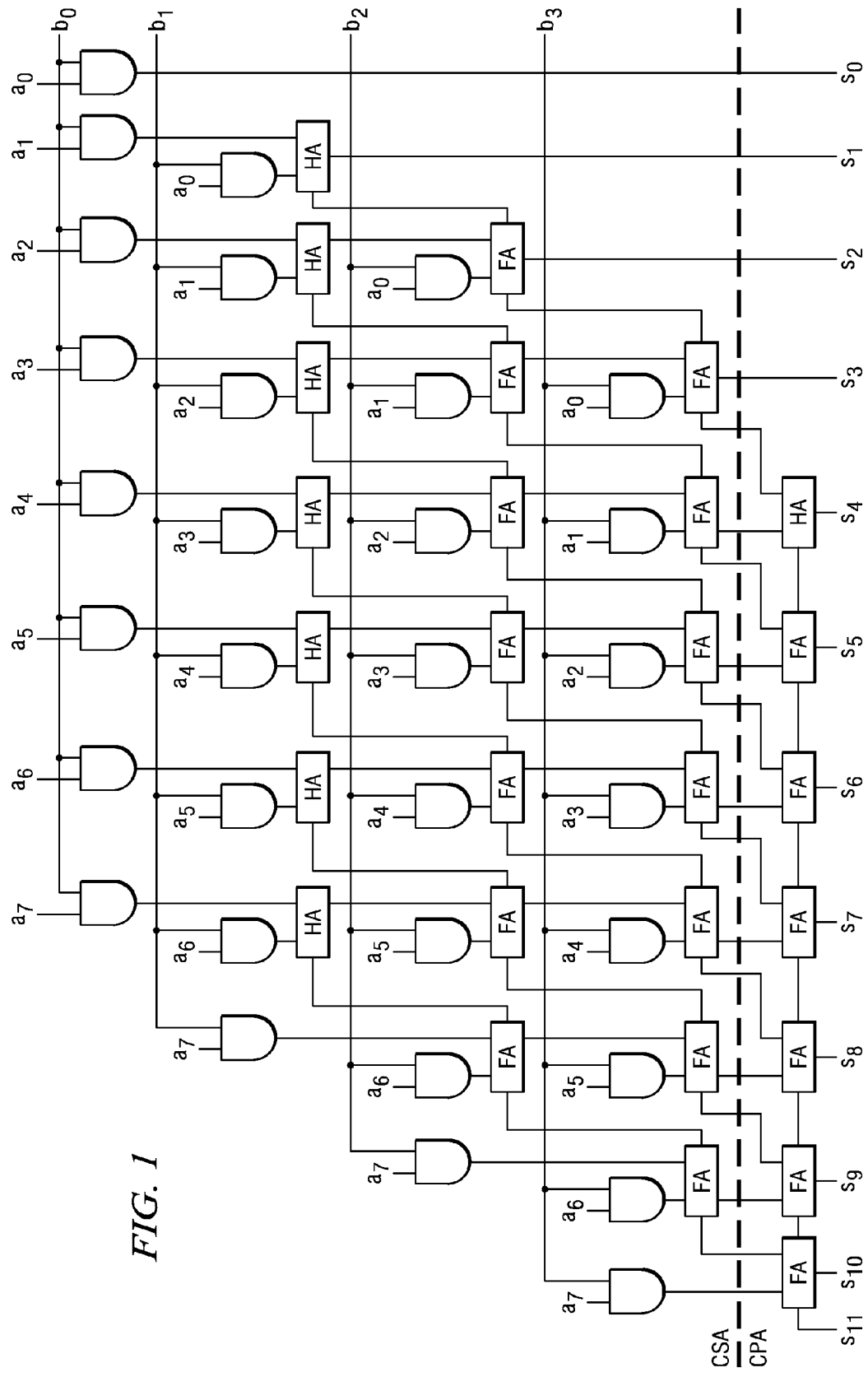
FIG. 1 shows a 8×4 bit unsigned parallel multiplier including a CSA array and a CPA unit.

The multiplication of two digital numbers is typically carried out by a series of single bit multiplications and single bit adding steps. A single bit multiplier is implemented by logic gates (typically AND gates) and the summation of two bits is carried out by half or full adder cells.

A half adder cell only adds two single bits of two different operands, whereas a full adder cell is able to handle an additional carry bit. An efficient algorithm for signed multiplication is the Baugh-Wooley method for signed multiplication described in "A two's complement parallel array multiplication algorithm" by C. R. Baugh and B. A. Wooley, IEEE Trans. Computers, Vol. 22, pp. 1045-1047, December 1973. The general theory of multiplication and multiplication according to the modified Baugh-Wooley method for signed multiplication is developed here below.

Table 1 shows a complete multiplication matrix for a 4 bit signed multiplication of a four digit first operand a and a four digit second operand b. The scheme of Table 1 is known as modified Baugh-Wooley method.

TABLE 1

|   |   |   |   |   |   | $a_3$ | $a_2$ | $a_1$ | $a_0$ |
|---|---|---|---|---|---|---|---|---|---|
| * |   |   |   |   |   | $b_3$ | $b_2$ | $b_1$ | $b_0$ |
|   |   |   |   |   |   | $/a_3b_0$ | $a_2b_0$ | $a_1b_0$ | $a_0b_0$ |
|   |   |   |   |   | $/a_3b_1$ | $a_2b_1$ | $a_1b_1$ | $a_0b_1$ |   |
|   |   |   |   | $/a_3b_2$ | $a_2b_2$ | $a_1b_2$ | $a_0b_2$ |   |   |
|   |   |   | $a_3b_3$ | $/a_2b_3$ | $/a_1b_3$ | $/a_0b_3$ |   |   |   |
|   | 1 |   |   |   | 1 |   |   |   |   |
| = | $p_7$ | $p_6$ | $p_5$ | $p_4$ | $p_3$ | $p_2$ | $p_1$ | $p_0$ |   |

In order to handle signed and unsigned operations the "1" bit values in column four and column seven have to be added. Further, the single bit products at the most significant positions of the first three rows and the single bit products in the last row except the most significant position have to be inverted, which is indicated by a leading slash as $/a_xx_j$. The eight digit binary number p[7:0] is then the product of a[3:0] and b[3:0].

Table 2 illustrates the modified Baugh-Wooley method for a multiply and accumulate (MAC) operation. The two four digit numbers a[3:0] and b[3:0] are multiplied and the eight digit binary number t[7:0] is added to the product.

TABLE 2

|   |   |   |   |   |   |   | $a_3$ | $a_2$ | $a_1$ | $a_0$ |
|---|---|---|---|---|---|---|---|---|---|---|
| * |   |   |   |   |   |   | $b_3$ | $b_2$ | $b_1$ | $b_0$ |
| + | $t_7$ | $t_6$ | $t_5$ |   | $t_4$ | $t_3$ | $t_2$ | $t_1$ | $t_0$ |   |
|   |   |   |   |   | $/a_3b_0$ | $a_2b_0$ | $a_1b_0$ | $a_0b_0$ |   |   |

TABLE 2-continued

|   |   |   |   | /$a_3b_1$ | $a_2b_1$ |   | $a_1b_1$ | $a_0b_1$ |
|---|---|---|---|---|---|---|---|---|
|   |   |   | /$a_3b_2$ | $a_2b_2$ | $a_1b_2$ |   | $a_0b_2$ |   |
|   |   | $a_3b_3$ | /$a_2b_3$ | /$a_1b_3$ | /$a_0b_3$ |   |   |   |
| 1 | 1 |   |   | 1 |   |   |   |   |
| $t_7$ | $t_7$ | $t_6$ | $t_5$ | $t_4$ | $t_3$ | $t_2$ | $t_1$ | $t_0$ |
| = $s_8$ | $s_7$ | $s_6$ | $s_5$ | $s_4$ | $s_3$ | $s_2$ | $s_1$ | $s_0$ |

As shown in Table 2, the '1' in column seven is to be sign extended, which results in an additional "1" bit value to be added in column eight. However, the schemes of Tables 1 and 2 are not suitable to multiply and accumulate signed operands a[n:0] and b[m:0] of different and/or varying length, i.e. for different and varying values of m and n. In particular, a hardwired circuitry implementing either one of the schemes shown Tables 1 and 2 will not be suitable to perform multiply and accumulate operations on operands having a length of e.g. two bits or eight bits. Therefore, according to prior art solutions, multipliers or MAC units have to be dimensioned for operands of maximum size and they have to be operated as if maximum size operands are processed. Other solutions use unsigned operands and successive negation in order to provide signed multiplication or use modified half adder or full adder cells. The drawback is that no standard library cells can be used. Most circuits implemented according to conventional solutions need more clock cycles and consume more power or chip area than necessary.

According to the present invention a method for multiplying a first signed operand consisting of na bits and a second signed operand consisting of nb bits, with na and nb being different positive integer numbers, is provided. Single bit products of pairs of single bits from the first operand and single bits from the second operand are generated with a logical AND function. Thereby na times nb single bit products are produced. Some of the single bit products are selectively inverted. This can be done in accordance with the Baugh-Wooley algorithm as explained before. Accordingly, the inverting step is applied to the single bit products of the first operand bit na−1 multiplied with the second operand bits 0 to nb−2 (i.e. all single bit products of a[na−1]*b[i] for i=0 to nb−2) and to the single bit products of the second operand bits 0 to na−2 multiplied with the second operand bit nb−1 (i.e. all single bit products of b[nb−1]*a[i] for i=0 to na−2).

The single products (i.e. the inverted single bit products as well as the unchanged single bit products) are added in accordance with their respective order for producing an intermediate product (i.e. as it is shown in Tables 1 and 2 hereinabove). Finally, a '1' bit value is added to bit positions nb−1, na−1 and na+nb−1 for receiving a final product. According to this aspect of the present invention, signed operands of variable size, where na≠nb, can be multiplied by adding '1' bit values at respective positions na−1, nb−1, and na+nb−1 of the intermediate product.

The following example serves to illustrate some important aspects of the present invention. In the present example, a multiplication of an unsigned 8 bit first operand a[7:0] and an unsigned 4 bit second operand b[3:0] based on an addition of four 8 bit values is considered:

$$p[11:0]=a[7:0]*b[3:0]$$

TABLE 3

|   |   |   | $a_7$ | $a_6$ | $a_5$ | $a_4$ | $a_3$ | $a_2$ | $a_1$ | $a_0$ |
|---|---|---|---|---|---|---|---|---|---|---|
| * |   |   |   |   |   |   | $b_3$ | $b_2$ | $b_1$ | $b_0$ |
|   |   |   | $a_7b_0$ | $a_6b_0$ | $a_5b_0$ | $a_4b_0$ | $a_3b_0$ | $a_2b_0$ | $a_1b_0$ | $a_0b_0$ |
|   |   | $a_7b_1$ | $a_6b_1$ | $a_5b_1$ | $a_4b_1$ | $a_3b_1$ | $a_2b_1$ | $a_1b_1$ | $a_0b_1$ |   |
|   | $a_7b_2$ | $a_6b_2$ | $a_5b_2$ | $a_4b_2$ | $a_3b_2$ | $a_2b_2$ | $a_1b_2$ | $a_0b_2$ |   |   |
| $a_7b_3$ | $a_6b_3$ | $a_5b_3$ | $a_4b_3$ | $a_3b_3$ | $a_2b_3$ | $a_1b_3$ | $a_0b_3$ |   |   |   |
| = $p_{11}$ | $p_{10}$ | $p_9$ | $p_8$ | $p_7$ | $p_6$ | $p_5$ | $p_4$ | $p_3$ | $p_2$ | $p_1$ | $p_0$ |

For an 8 bit×4 bit signed multiplication of two's complement first and second operands a and b the matrix looks as follows:

TABLE 4

|   |   |   | $a_7$ | $a_6$ | $a_5$ | $a_4$ | $a_3$ | $a_2$ | $a_1$ | $a_0$ |
|---|---|---|---|---|---|---|---|---|---|---|
| * |   |   |   |   |   |   | $b_3$ | $b_2$ | $b_1$ | $b_0$ |
|   |   |   | −$a_7b_0$ | $a_6b_0$ | $a_5b_0$ | $a_4b_0$ | $a_3b_0$ | $a_2b_0$ | $a_1b_0$ | $a_0b_0$ |
|   |   | −$a_7b_1$ | $a_6b_1$ | $a_5b_1$ | $a_4b_1$ | $a_3b_1$ | $a_2b_1$ | $a_1b_1$ | $a_0b_1$ |   |
|   | −$a_7b_2$ | $a_6b_2$ | $a_5b_2$ | $a_4b_2$ | $a_3b_2$ | $a_2b_2$ | $a_1b_2$ | $a_0b_2$ |   |   |
| $a_7b_3$ | −$a_6b_3$ | −$a_5b_3$ | −$a_4b_3$ | −$a_3b_3$ | −$a_2b_3$ | −$a_1b_3$ | −$a_0b_3$ |   |   |   |
| = $p_{11}$ | $p_{10}$ | $p_9$ | $p_8$ | $p_7$ | $p_6$ | $p_5$ | $p_4$ | $p_3$ | $p_2$ | $p_1$ | $p_0$ |

The following substitutions can be made:

$$-a_7b_k=(1-a_7b_k)-1=\text{not}(a_7b_k)-1$$

$$-a_kb_0=(1-a_kb_3)-1=\text{not}(a_kb_3)-1$$

wherein the negative sign of a single bit product can be transformed into a not(−)operation, which is similar to an inversion of the single bit product, and the subtraction of a '1' bit value.

With these substitutions the matrix of Table 4 looks as shown in Table:

TABLE 5

|   |   | $a_7$ | $a_6$ | $a_5$ | $a_4$ | $a_3$ | $a_2$ | $a_1$ | $a_0$ |
|---|---|---|---|---|---|---|---|---|---|
| * |   |   |   |   |   | $b_3$ | $b_2$ | $b_1$ | $b_0$ |
|   | /$a_7b_0$ | $a_6b_0$ | $a_5b_0$ | $a_4b_0$ | $a_3b_0$ | $a_2b_0$ | $a_1b_0$ | $a_0b_0$ |   |
| /$a_7b_1$ | $a_6b_1$ | $a_5b_1$ | $a_4b_1$ | $a_3b_1$ | $a_2b_1$ | $a_1b_1$ | $a_0b_1$ |   |   |

TABLE 5-continued

|   |   | /a7b2 | a6b2 | a5b2 | a4b2 | a3b2 | a2b2 | a1b2 | a0b2 |   |   |
|---|---|---|---|---|---|---|---|---|---|---|---|
|   | a7b3 | /a6b3 | /a5b3 | /a4b3 | /a3b3 | /a2b3 | /a1b3 | /a0b3 |   |   |   |
|   | −1 | −1 | −1 |   |   |   |   |   |   |   |   |
|   | −1 | −1 | −1 | −1 | −1 | −1 | −1 |   |   |   |   |
| = | p11 | p10 | p9 | p8 | p7 | p6 | p5 | p4 | p3 | p2 | p1 | p0 |

For different operand sizes na and nb the "−1" entries can be combined as follows:

$$(-1)^{*}2^{na-2+nb-1} + \ldots + (-1)^{*}2^{na-1} + (-1)^{*}2^{na-2+nb-1} + \ldots + (-1)^{*}2^{nb-1} =$$

$$(-1)^{*}2^{na+nb-2} + 2^{na-1} + (-1)^{*}2^{na+nb-2} + 2^{nb-1} =$$

$$-2^{na+nb-1} + 2^{na-1} + 2^{nb-1},$$

wherein na>1 and nb>1. So '1' bit values have to be added to columns na−1 and nb−1 and a negative '1' bit value ('−1') has to be added to column na+nb−1. Because the result has the two's complement format the "−1" in column na+nb−1 (=sign digit) changes to "1". The adapted matrix for the 8 bit×4 bit signed multiplication is shown in Table 6.

The scheme for signed operands is depictured in Table 8. The signed digit of the accumulator ($t_{11}$) and the "1" in column 11 have to be sign-extended.

TABLE 6

|   |   |   |   | a7 | a6 | a5 | a4 | a3 b3 | a2 b2 | a1 b1 | a0 b0 |
|---|---|---|---|---|---|---|---|---|---|---|---|
| * |   |   |   |   |   |   |   |   |   |   |   |
|   |   |   |   | /a7b0 | a6b0 | a5b0 | a4b0 | a3b0 | a2b0 | a1b0 | a0b0 |
|   |   |   | /a7b1 | a6b1 | a5b1 | a4b1 | a3b1 | a2b1 | a1b1 | a0b1 |   |
|   |   | /a7b2 | a6b2 | a5b2 | a4b2 | a3b2 | a2b2 | a1b2 | a0b2 |   |   |
|   | a7b3 | /a6b3 | /a5b3 | /a4b3 | /a3b3 | /a2b3 | /a1b3 | /a0b3 |   |   |   |
| 1 |   |   |   | 1 |   |   |   | 1 |   |   |   |
| = | p11 | p10 | p9 | p8 | p7 | p6 | p5 | p4 | p3 | p2 | p1 | p0 |

This generic method can be used for signed multiplication of two's complement values with any operand sizes. According to an aspect of the present invention, a third operand can be added to the intermediate product, wherein the third operand has a bit size of nt bits. In this situation the '1' bit value at position na+nb−1 must be sign extended if nt is greater than na+nb−1. This aspect of the invention relates to a multiply and accumulate operation.

The method for signed multiplication of operands with different operand sizes can also be used in a MAC (multiply and accumulate) operation s=a*b+t where the operands a and b have the sizes na and nb. An additional row for the accumulator t (third operand) is added to the previously explained schemes. First, an illustrative example of an unsigned MAC operation of a first operand a with 8 bit (i.e. na=8) and a second operand b with 4 bit (i.e. nb=4) and a third operand t with 12 bit (i.e. nt=12) is given herein below: s[12:0]=a[7:0]*b[3:0]+t[11:0]

TABLE 7

|   |   |   |   |   | a7 | a6 | a5 | a4 | a3 b3 | a2 b2 | a1 b1 | a0 b0 |
|---|---|---|---|---|---|---|---|---|---|---|---|---|
| * |   |   |   |   |   |   |   |   |   |   |   |   |
| + | t11 | t10 | t9 | t8 | t7 | t6 | t5 | t4 | t3 | t2 | t1 | t0 |
|   |   |   |   |   | a7b0 | a6b0 | a5b0 | a4b0 | a3b0 | a2b0 | a1b0 | a0b0 |
|   |   |   |   | a7b1 | a6b1 | a5b1 | a4b1 | a3b1 | a2b1 | a1b1 | a0b1 |   |
|   |   |   | a7b2 | a6b2 | a5b2 | a4b2 | a3b2 | a2b2 | a1b2 | a0b2 |   |   |
|   |   | a7b3 | a6b3 | a5b3 | a4b3 | a3b3 | a2b3 | a1b3 | a0b3 |   |   |   |
|   | t11 | t10 | t9 | t8 | t7 | t6 | t5 | t4 | t3 | t2 | t1 | t0 |
| = | s12 | s11 | s10 | s9 | s8 | s7 | s6 | s5 | s4 | s3 | s2 | s1 | s0 |

TABLE 8

| | | | | | $a_7$ | $a_6$ | $a_5$ | $a_4$ | $a_3$ | $a_2$ | $a_1$ | $a_0$ |
|---|---|---|---|---|---|---|---|---|---|---|---|---|
| * | | | | | | | | | $b_3$ | $b_2$ | $b_1$ | $b_0$ |
| + | $t_{11}$ | $t_{10}$ | $t_9$ | $t_8$ | $t_7$ | $t_6$ | $t_5$ | $t_4$ | $t_3$ | $t_2$ | $t_1$ | $t_0$ |
| | | | | | /$a_7b_0$ | $a_6b_0$ | $a_5b_0$ | $a_4b_0$ | $a_3b_0$ | $a_2b_0$ | $a_1b_0$ | $a_0b_0$ |
| | | | | /$a_7b_1$ | $a_6b_1$ | $a_5b_1$ | $a_4b_1$ | $a_3b_1$ | $a_2b_1$ | $a_1b_1$ | $a_0b_1$ | |
| | | | /$a_7b_2$ | $a_6b_2$ | $a_5b_2$ | $a_4b_2$ | $a_3b_2$ | $a_2b_2$ | $a_1b_2$ | $a_0b_2$ | | |
| | | $a_7b_3$ | /$a_6b_3$ | /$a_5b_3$ | /$a_4b_3$ | /$a_3b_3$ | /$a_2b_3$ | /$a_1b_3$ | /$a_0b_3$ | | | |
| | $t_{11}$ 1 | $t_{11}$ 1 | $t_{10}$ | $t_9$ | $t_8$ | $t_7$ | $t_6$ | $t_5$ | $t_4$ | $t_3$ 1 | $t_2$ | $t_1$ | $t_0$ |
| = | $s_{12}$ | $s_{11}$ | $s_{10}$ | $s_9$ | $s_8$ | $s_7$ | $s_6$ | $s_5$ | $s_4$ | $s_3$ | $s_2$ | $s_1$ | $s_0$ |

Advantageously, a multiplier according to the present invention can be adapted such that a smaller segment of either the first operand or the second operand or of both can be selected. An intermediate partial product is then calculated on the selected segment and an operand or on two segments. Preferably, the '1' bit values are added to the intermediate partial products at respective positions corresponding to positions nb−1, na−1 and na+nb−1 of the intermediate product. The use of segments allow hardware to be kept small and less complex, as the steps of multiplying, inverting and adding are partially serialized. The following Table 9 illustrates a multiplication of a four bit operand b[3:0] and an eight bit operand a[7:0]. The multiplication is partitioned into two 4×4 bit operations.

TABLE 9

| | | | | $a_7$ | $a_6$ | $a_5$ | $a_4$ | $a_3$ | $a_2$ | $a_1$ | $a_0$ |
|---|---|---|---|---|---|---|---|---|---|---|---|
| * | | | | | | | | $b_3$ | $b_2$ | $b_1$ | $b_0$ |
| | | | | /$a_7b_0$ | $a_6b_0$ | $a_5b_0$ | $a_4b_0$ | $a_3b_0$ | $a_2b_0$ | $a_1b_0$ | $a_0b_0$ |
| | | | /$a_7b_1$ | $a_6b_1$ | $a_5b_1$ | $a_4b_1$ | $a_3b_1$ | $a_2b_1$ | $a_1b_1$ | $a_0b_1$ | |
| | | /$a_7b_2$ | $a_6b_2$ | $a_5b_2$ | $a_4b_2$ | $a_3b_2$ | $a_2b_2$ | $a_1b_2$ | $a_0b_2$ | | |
| | /$a_7b_3$ | /$a_6b_3$ | /$a_5b_3$ | /$a_4b_3$ | /$a_3b_3$ | /$a_2b_3$ | /$a_1b_3$ | /$a_0b_3$ | | | |
| 1 | | | | 1 | | | | 1 | | | |
| $p_{11}$ | $p_{10}$ | $p_9$ | $p_8$ | $p_7$ | $p_6$ | $p_5$ | $p_4$ | $p_3$ | $p_2$ | $p_1$ | $p_0$ |

The two partial operations differ in the position of the inverted partial products and in the additional "1" bit values at the most significant position. Accordingly, the '1' bit values have to be set with respect to the final product to be calculated, while the intermediate partial products on the left hand side and the right hand side of the bold line in Table 9 are calculated. Any carry bits of lower significant intermediate partial products with respect to higher significant intermediate partial products have to be considered, too. Segments are advantageous as they allow substantially the same hardware to be used for the segments of operands, while the operands can have varying and different bit sizes. The present invention provides the capability to perform operations on different segments of signed operands in a very efficient way.

The same hardware components only slightly differently configured can be used for calculating the intermediate partial products of different segments of operands. By use of segments, it is generally possible to multiply a first operand with a second operand of any length. The hardware can be optimized for a specific bit size of a segment or an operand. Then, the same hardware having only little configurability to adapt to different segment operations can be used for multiplying operands of twice the length of the first or the second operand or segments of both operands. The multiplication is then split into a plurality of multiplications of segments. It is to be understood that the term segment in the context of the present invention is different from its general meaning and implies more than only "a part of an operand".

An operation on segments is a specific operation producing intermediate partial products. The necessary '1' bit values can then be added to the intermediate partial products. When multiplying segments the rank (i.e. significance within the operand from which the segment is taken) must be taken into account in order to correctly consider the necessary single bit operations.

An example is shown in Table 9, where the first operand is subdivided into segments and the second operand remains complete during the partial multiplication steps. The first operand consists of na=8 bits and the second operand consists of nb=4 bits with na and nb being different positive integer numbers and na being greater than nb. Actually, the present invention is directed to multiplication of operands having variable and different operand sizes. The trivial case that the operands have equal size is also covered, but the invention resides in the adjustments, which are necessary to multiply the operands or segments with different bit sizes. In the present example, segments of na_seg=4 bits of the first operand, with na being an integer multiple of na_seg, are selected for carrying out respective partial multiplications of the segments of length na_seg with the second operand.

For each partial signed multiplication (for each segment) single bit products of pairs of single bits from a segment a_seg of the first operand and single bits from the second operand are generated by use of a logical AND function. Thereby, nb times na_seg single bit products are produced for each segment. In accordance with the above description, some of these single bit products have to be selectively inverted. For segments containing lower significant bits of the first operand the single bit products of bit nb−1 multiplied with the first operand bits 0 to 3 are inverted. For the segment of the first operand having the highest significant bits (i.e. a[7] to a[4]) only the single bit products of the bits of the second operand bit nb−1 multiplied with the first operand bits 0 to 2 (0 to na_seg-2) and the single bit products of the second operand bits 0 to nb−2 multiplied with the first operand segment bit na_seg-1 have to be inverted.

After the inverting step for each segment, the single bit products are added in accordance with their respective order for producing an intermediate partial product for each segment as shown in Table 9. For receiving the final product, the above identified '1' bit values have to be added to the intermediate partial products at respective positions corresponding to positions nb−1, na−1 and na+nb−1 of the intermediate product. The intermediate partial products are then added up to an intermediate product of the first and the second operand so as to obtain a final product.

If the intermediate product is merely produced by adding up the intermediate partial products the required additions of '1' bit values at positions corresponding to positions nb−1, na−1, and na+nb−1 can already be performed on the intermediate partial products. In this situation the intermediate product corresponds to the final product. However, if the intermediate product is the result of adding intermediate partial products, where the '1' bit values have not yet been added or no partial products were used at all, the intermediate product distinguishes from the final product in that the '1' bit values are still to be added to the intermediate product before it represents the final product.

Moreover, even smaller slices of a segment of an operand or of an operand can be selected. The steps of single bit multiplying, inverting and adding of the single bit products can be performed on a slice and a segment or a slice and an operand. According to this aspect of the invention, it is possible to further serialize the multiplication steps and to reduce size and complexity of the necessary partial multiplications.

According to aspects of the present invention, an operand or a segment may be further divided into slices. Also, any one of the operands may be divided into slices or into segments first and then into slices. In our example, the second operand is divided into segments and slices. In the following example a segment of the second operand is subdivided into slices. However, it is likewise and advantageously possible to apply the above concept on entire operands or segments of the first operand. In the present example, the first operand consists of na bits and the second operand consists of nb bits with na and nb being different positive integer numbers. The second operand is divided into segments d of a length of nd bits.

Further, slices of nx bits are selected of a segment d of the second operand, wherein the bit size nd of the segment is an integer multiple of nx. For each slice, a respective partial multiplication of the slice is carried out with the first operand. As described hereinabove for the segments, single bit products of pairs of single bits from a slice and single bits from the first operand are generated with a logical AND function, so as to produce nx times na single bit products for each slice. The inverting step of single bit products is carried out in view of the significance of the bits of the slice, in the same manner as described for a segment. After the inverting step, the single bit products are added in accordance with their respective order for producing an inferior intermediate partial product for each slice.

The inferior intermediate partial products of each slice are then added up to an intermediate partial product of the first operand and the segment of the second operand. Only, after having added the inferior intermediate partial products to an intermediate partial product of a segment and the operand, the '1' bit values are added at respective positions corresponding to positions nb−1, na−1 and na+nb−1 of the intermediate product. The operation on slices is different from segment-wise operation, insofar the inferior intermediate partial products of slice based operations are first added up before the '1' bit values are added. The segmentation is used to perform operations with basically the same hardware on operands of variable size. However, the slices are used to serialize the computing for non-varying operands or segments.

The present invention relates also to a multiply unit for multiplying a first operand consisting of na bits and a second operand consisting of nb bits. na and nb are different positive integer numbers. The multiply unit according to the present invention comprises logical AND functions for generating single bit products of pairs of single bits from the first operand and single bits from the second operand, so as to produce na times nb single bit products. For signed operands, there is logical circuitry for selectively inverting the single bit products of the first operand bit na−1 (i.e. the bit at bit position na−1 of the first operand a) multiplied with the second operand bits 0 to nb−2, respectively.

Accordingly, nb−1 inversions are performed. Further, the logic circuitry is adapted to invert the single bit products of the second operand bits 0 to na−2 multiplied with the second operand bit nb−1, i.e. another na−1 inversions are performed. There is also a first adder stage for adding the single bit products in accordance with their respective order for producing an intermediate product, and a second adder stage for adding '1' bit values to the intermediate product at positions nb−1, na−1 and na+nb−1 for receiving a final product. Accordingly, the multiply unit according to the present invention, implements the method according to the present invention. The first adder stage and the second adder stage are not necessarily physically separated from each other, however, some advantageous embodiments, where rather individual adder stages for the two adding operations are provided, will be given in the description herein below.

Advantageously, the multiply unit is adapted to be switched between signed and unsigned multiplication. Then, the multiply unit comprises logic circuitry for deactivating the logical circuitry for inverting of single bit products and for deactivating the adding of "1" bit values in the second adder unit.

Preferably, the multiply unit comprises a second adder stage for adding a third operand of bit size nt to the intermediate product, a sign extension means for sign extending the '1' bit value at position na+nb−1 if nt is greater than na+nb−1, wherein the second adder stage is adapted to add the sign extended '1' bit values to the intermediate product. If two rather independent adder stages are used for adding single bit products and '1' bit values for sign extension, the '1' bit value adding step for sign extension can be performed in parallel (i.e. separately) from to the adding step relating to the single bit products. Thereby, important processing capacity and time can be saved.

In an advantageous embodiment, the multiply unit comprises multiplexing and controlling means for selecting smaller segments of the first operand or the second operand. The AND functions, the first adder stage, and the logical circuitry for inverting single bit products are adapted to generate an intermediate partial product on a segment and an operand or on two segments. The second adder stage can then be further adapted to add '1' bit values to the intermediate partial products at respective positions corresponding to positions nb−1, na−1 and na+nb−1 of the intermediate product.

For example, the multiplexing and controlling means can be adapted to select segments of na_seg=4 bits of the first operand a as shown hereinabove in Table 9. na_seg is an integer multiple of na. Respective partial multiplications of the segments have to be carried out. Any logic circuitry implementing the logic AND functions for generating single bit products of pairs of single bits from the segment a_seg of the first operand and single bits from the second operand, can be used to produce na_seg times nb single bit products. The logic circuitry for selectively inverting single bit products is then adapted to switch between processing segments in view of their bit significance. For the segment containing lower significant bits of the first operand, only the single bit products of nb−1 multiplied with the first operand bits 0 to na_seg-1 (i.e. 0 to 3) are inverted.

For the most significant segment (i.e. bits a[7] to a[4]) also the single bit products of the first operand segment bit na_seg-1 multiplied with the second operand bit 0 to nb−2 are inverted. However, for the most significant segment the single bit product a[na_seg-1] times b[nb−1] (i.e. a[7] times b[3]) is not inverted. Also, the first adder stage can be reduced in size compared with a solution where all single bit products are calculated and added at once. The second adder stage can be used for combining the intermediate partial products with other intermediate partial products of the first and the second operand so as to obtain a final product.

However, preferably, the second adder stage is further adapted to add '1' bit values to the intermediate partial products at respective positions corresponding to positions nb−1, na−1 and na+nb−1 of the intermediate product. Dependent on the respective segment to be processed, the position at the intermediate partial product, where the '1' bit value is to be added, can vary. The second adder stage is then adapted to take account of these variations.

According to another aspect of the present invention, the multiplexing and controlling means included in the electronic device according to the present invention are further adapted to select smaller slices of a segment and/or an operand. The AND functions, the first adder stage, and the logical circuitry for inverting single bit products are then preferably adapted to generate an intermediate partial product on either a slice and a segment or on a slice and an operand. This aspect of the present invention provides a further serialization of the multiplication.

The concept of using slices aims to limit the hardware towards reduced complexity for the smaller slices. Thereby, it is possible to implement fewer rows in the hardware array. This concept costs additional clock cycles. The tradeoff between clock cycles (i.e. processing time) and hardware size is to be resolved on a case by case basis and depends on the application. Segments are advantageous as they allow the same hardware to be used for operands having different and varying bit sizes. This provides also the capability to perform operations on different segments of operands (shown in FIG. 6).

It is generally possible to calculate a times b with segments or slices. Using segments allows multiplication of a/ka times b or a times b/kb or even a/ka times b/kb, where ka and kb are positive integer values, with basically the same configurable hardware. In an advantageous configuration, for example, multiplication of a times b, a/2 times b or a times b/2 or even a/2 times b/2 can be implemented. The difference between segments and slices, resides in the fact, that the '1' bit values to be added at positions corresponding to positions nb−1, na−1 and na+nb−1 of the intermediate product are only added after processing of all slices of a segment or operand. For a segment, the respective '1' bit values are preferably added after processing of each segment.

For example, the multiply unit has a multiplexing and controlling means which is adapted to select slices of nx bits of the second operand. nb is an integer multiple of nx for carrying out respective partial multiplications of the slices with the first operand. The multiply unit comprises logic circuitry providing logic AND functions for generating single bit products of pairs of single bits from a slice of the second operand and single bits from the first operand. So, the size of a hardwired solution can be reduced compared with a solution where a complete segment or operand is calculated. The result is partial serialization of the operations. Actually, for each slice only nx times na single bit products have to be produced. Further, the inverting of single bit products and the respective circuitry must be adapted as explained above.

According to an aspect of the invention, the first adder stage is a carry save adder (CSA) unit with a fixed number of rows each comprising AND gates for calculating the single bit product of two single bit input values and adder cells for adding results of a preceding row to a following row and a last output row for outputting a carry vector and a sum vector. A CSA unit is a very efficient architecture for performing the adding of the single bit products. The controlling and multiplexing means can comprise at least one multiplexer for selectively supplying at least a segment of na_seg bits of the first operand and/or at least a segment of nd bits of the second operand to the CSA unit. The second adder stage can advantageously be implemented as a carry propagate adder (CPA) unit coupled to the CSA unit and consisting of a row of full adder cells for adding the carry vector and the sum vector provided at the output row of the CSA unit.

A first feedback path can be provided for feeding back an intermediate product or an intermediate partial product output from the CPA unit back to the CSA unit and to the CPA unit to be added to another intermediate product or intermediate partial product. The intermediate (partial) products can be added in a first adder stage like e.g. the CSA unit and a second adder stage, (i.e. in the CPA unit) by use of a feedback configuration, adapted to feed back the intermediate (partial) products in order to add those intermediate (partial) products to each other. The CPA unit is then preferably used to add the carry and sum vectors output from the CSA unit and also the '1' bit values at the respective positions to the intermediate products. Therefore, the CPA unit must be controlled and adapted to correctly take account of the segment of an operand, which is to be processed. The '1' bit values to be added and their respective positions vary dependent on the rank of the segment.

The controlling and multiplexing means can preferably provide a first "1" entry logic, coupled to a carry input of a full adder at the least significant position of the CPA unit and adapted to selectively feed "1" or "0" bit values to the carry input in response to at least a segment count signal indicating the segment of the first and/or second operand to be processed and a first configuration signal indicating signed and unsigned two's complement operands. At least these two control signals can be used to control the proper operation of the multiply unit for segment and slice operation. Further, a second "1" entry logic can be provided and coupled to the full adder at the most significant position of the CPA unit, which is adapted to selectively feed "1" or "0" bit values to the sum input of the full adder in response to at least the segment count signal indicating the segment of the first and/or second operand to be processed and the first configuration signal indicating signed and unsigned two's complement operands.

The controlling and multiplexing means can include the first multiplexer, a second multiplexer, and a third multiplexer, the first multiplexer being adapted to selectively supply at least a segment of na_seg bits of the first operand to the CSA unit, wherein na is an integer multiple of na_seg. The second multiplexer is then adapted to selectively supply a segment of nd bits of the second operand to the third multiplexer, wherein nb is an integer multiple of nd. The third multiplexer is adapted to selectively supply slices of nx bits of the received segment d of the second operand b to the CSA unit. The CSA unit preferably includes the logical circuitry for selectively inverting the single bit products at the most significant position of all rows and all positions of the output row in response to control signals.

The necessary control signals are generated by the controlling and multiplexing means based on at least the first configuration signal (i.e. the signal indicating signed or unsigned operation), the second configuration signal (i.e. the signal indicating the segment number) and a third configuration signal indicating the slice number before inputting the selectively inverted single bit products to respective adder cells. A CSA unit using these control signals is very flexible and suitable to perform all necessary operations on operands with variable size.

A third register can be provided for storing the intermediate products and a final product. The third register is coupled to the least significant full adders of each row of the full adders of the CSA unit for receiving the less significant parts of a ready sum vector. The third register is further coupled to the CPA unit for receiving the more significant parts of the ready sum vector. The first feedback path is coupled to the third register (and via the third register also to the CPA unit) for feeding back an intermediate result to the CSA unit.

The first feedback path is also provided for feeding back a third operand contained in the third register to the CSA unit to be added to the final product of the first and the second operand. Still further, there is a first register for storing a temporary sum vector and second register for storing a temporary carry vector to be output from the CSA unit. The third register completes the multiply unit to serve as a multiply and accumulate unit. The first and second registers allow a partial serialization of the operation using slices and thereby increase flexibility of the multiply unit according to the present invention in terms of variability of the number of clock cycles and the number of rows (i.e. size) of the CSA unit.

A second feedback path couples the content of the third register back to the CPA input. This feedback connection is preferably used to perform sign extension operations, i.e. a whole sequence of '1' bit values can be added at once to an intermediate partial product by use of the feedback connection. For this purpose, the controlling and multiplexing means can comprise a sixth multiplexer coupled to the first register and to a register or another means for holding and providing a sequence of '1' bit values to the sixth multiplexer for selectively supplying either the temporary sum vector or the sequence of '1' bit values to the CPA unit.

A seventh multiplexer may be coupled with an input to the second register, and to the third register and with an output to the input of the CPA unit for selectively supplying either the carry vector from the second register or a contents of the third register to the CPA unit. The provision of the sixth and seventh multiplexer allows sign extension of the leading one bit value to be performed very efficiently, if the third operand size is greater than the combined size of the first and the second operand. Actually, the sign extension can then be performed in parallel (i.e. at the same time) to operation steps in the CSA unit. This saves important clock cycles and allows carry and sum vectors or sequences of '1' bit to be flexibly processed, the latter only if the third operand is larger than the combined bit size of the first and second operand.

Advantageously, each row of the CSA unit comprises the same number of full adder cells and AND gates. This provides for a very easy implementation and improves reliability of the circuits. Standard cell libraries can be used and no modifications of standard cells like full adders or half adders are necessary. This is a particular advantage of the present invention, as many prior art solutions are bound to modified standard cells.

The third multiplexer can be adapted to successively input nx bit wide portions of the second operand to the carry save unit, wherein nb is ns times nx, ns being a positive integer in order to process the entire multiplication in ns slices. One slice is processed for each portion of the second operand thereby consecutively calculating a product of the first operand and the second operand to be finalized after the last slice. Likewise, it is possible to adapt the multiply unit to process slices of any one of the operands or of segments of both operands. A first feedback connection can couple the third register to the CSA unit and also to the CPA unit for feeding back a content of the third register, in particular, the third operand or intermediate partial products or segments or slices thereof for being further processed in the CSA unit and the CAP unit.

This way, the multiply unit becomes a multiply and accumulate unit with an accumulator (third register) to store the value to be added to the multiplication result. A third feedback connection can be present, which is coupled to the first register and the second register and to the CSA unit for feeding back the temporary sum vector and the temporary carry vector to the CSA unit for processing of the respective following slice. The CSA unit is adapted to selectively switch between processing of the last slice and previous slices in response to control signals based on configuration signals (e.g. the first, the second and/or the third configuration signal); for example, the single bit products at all but the most significant position of the last row of the CSA unit are only inverted for the last slice of a signed two's complement operation and the single bit product at the most significant position of the last row is always inverted for signed two's complement operation except for the last slice. Practically, the CPA unit according to the present invention must be adapted to add "1" bit values at these varying positions dependent on the rank of the segments of the operands which are processed.

FIG. 1 shows an 8×4 bit unsigned parallel multiplier including a CSA array and a CPA unit. The regular structure is a multiply unit for multiplying a first operand OP1=a consisting of 8 bit with a second operand OP2=b consisting of 4 bit. The result is the product s. The first row of the CSA unit does not need adders. Only AND gates are provided for producing single bit products of two single bit values from the first operand a and the second operand b. The second row of the CSA unit has half adders HA for performing the summing of single bit products output from the AND gates of the first and second row. Both, the third and fourth row have full adders FA in order to sum two bits and an additional carry bit. The final row of full adders FA and one half adder HA at the least significant position is a ripple carry adder, which is an example for a carry propagate adder CPA for summing the temporary sum vector and temporary carry vector output at the last row of the CSA unit.

Figure 2:
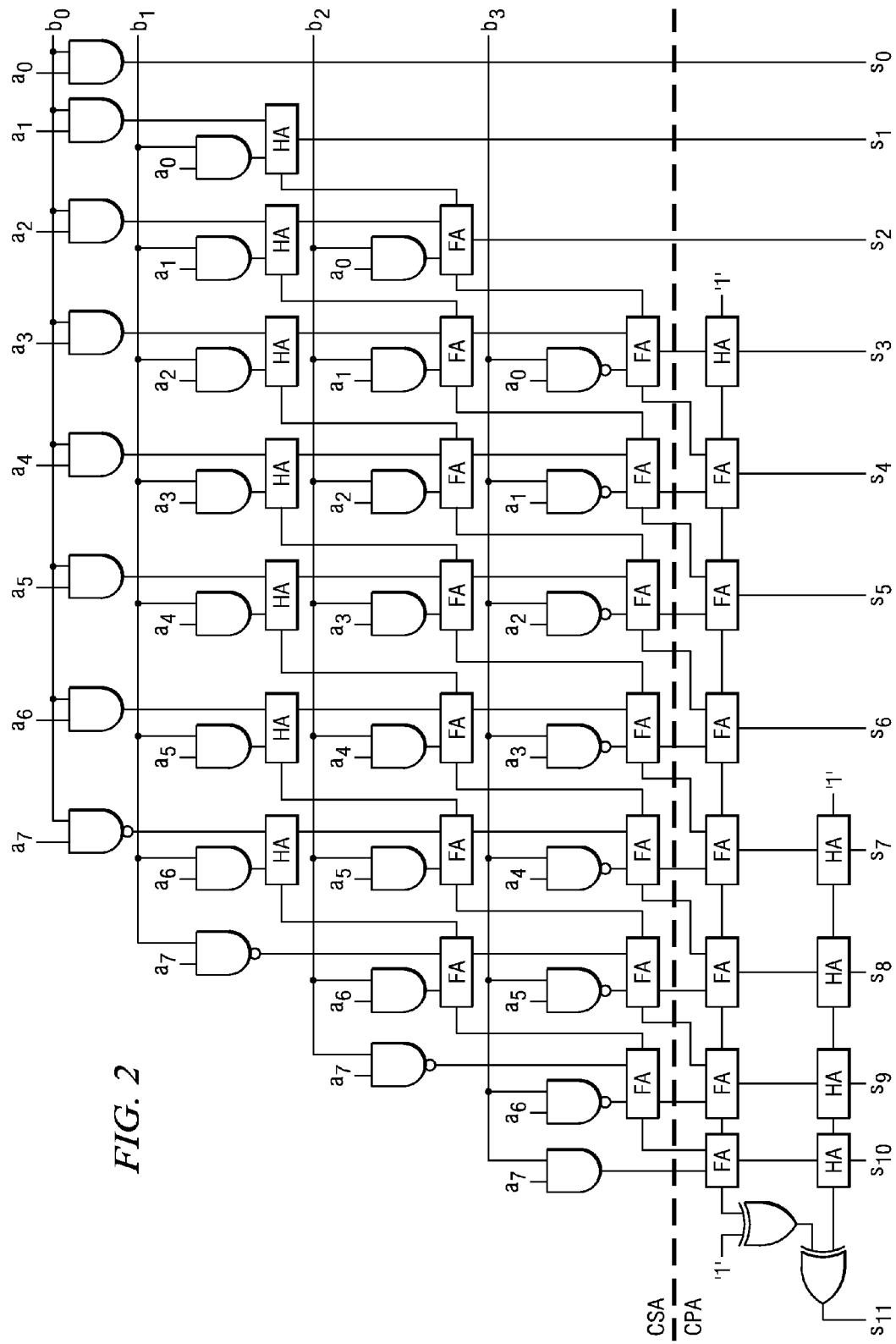
FIG. 2 shows a 8×4 bit signed multiply unit including a CSA array and a corresponding CPA unit according to aspects of the present invention.

FIG. 2 shows an 8×4 bit signed multiply unit including a CSA array and a corresponding CPA unit. The multiply unit corresponds to Table 6 hereinabove. The last two rows of adder cells represent the CPA unit. The CPA unit is adapted to perform the addition of '1' bit values at positions na−1=7, nb−1=3 and na+nb−1=11. The '1' bit value at position 11 is added through two XOR gates. The single bit products in the last output row of the CSA unit (corresponding to nb−1=3) are inverted. Therefore, the AND gates, which were shown in FIG. 1, are replaced by NAND gates providing the inverting step. Also the single bit products at the most significant positions (i.e. at position na−1=7) of rows 0 to nb−2 (i.e. in row 0, 1, and 2) are also inverted by using a NAND gate instead of an AND gate. Accordingly, the multiply unit shown in FIG. 2 is a implementation of an embodiment of the present invention.

Figure 3:
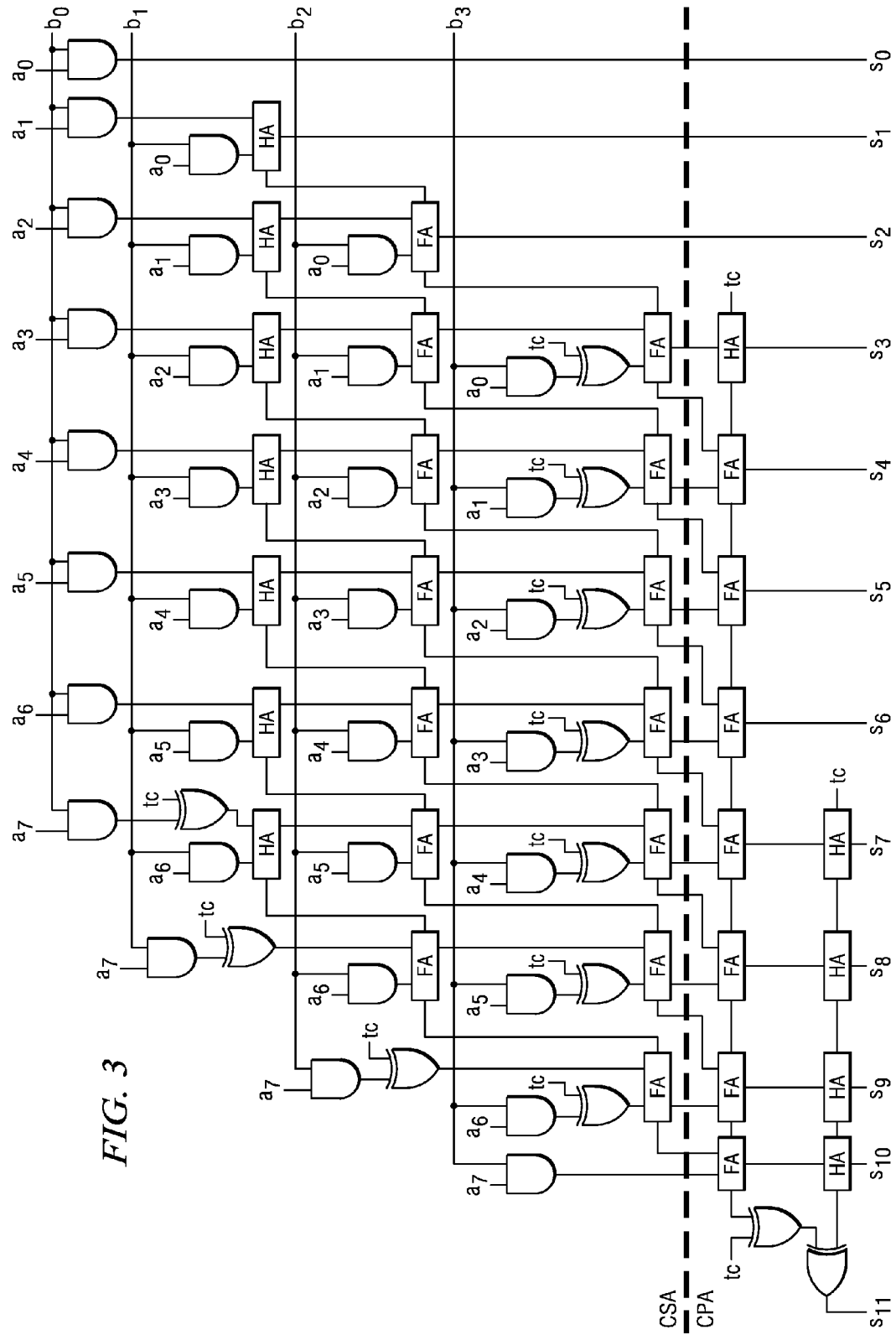
FIG. 3 shows a 8×4 bit selectable signed/unsigned parallel multiply unit including a CSA array and CPA unit according to aspects of the present invention.

FIG. 3 shows an 8×4 bit selectable signed/unsigned parallel multiply unit including a CSA array and CPA adder stage according to the present invention. In order to switch between unsigned and signed operation, a first configuration signal tc is used. The first configuration signal tc is fed to an input of XOR gates provided at positions, where an inversion is to be performed in case of signed operands. The NAND gates of FIG. 2 are now substituted by AND gates. If the first configuration signal tc is high (i.e. for tc='1'), the circuit performs the same operation as the circuit in FIG. 2. If the first configuration signal is low (i.e. for tc='0'), the circuit performs unsigned multiplication of a and b, similar to the circuit shown in FIG. 1.

Figure 4:
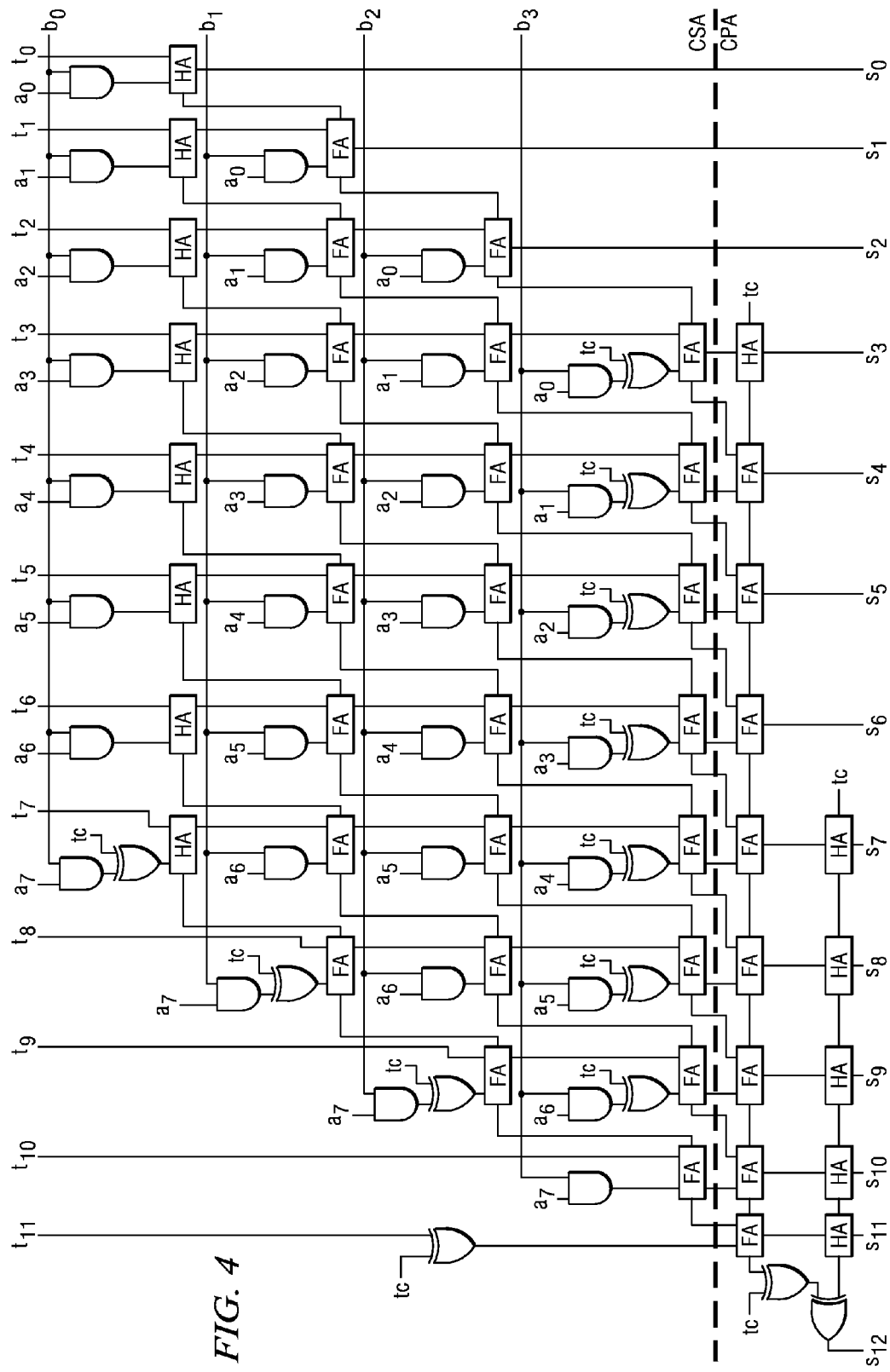
FIG. 4 shows a 8×4 bit selectable signed/unsigned parallel MAC unit including a CSA array and CPA unit according to aspects of the present invention.

FIG. 4 shows an 8×4 bit selectable signed/unsigned parallel MAC unit including a CSA array and CPA stage in accordance with aspects of the present invention. The MAC unit in FIG. 4 is basically similar to the circuit shown in FIG. 3, except that a third operand t can now be added to the product of a and b. The circuit can be switched between signed and unsigned operation through the first configuration signal tc. However, the output signal s has now a bit length of ns=13 bit as the third operand t consists of 12 bit. A difference with regard to FIG. 3 is that an additional '1' bit value must be added at the most significant position nt−1=12, because the '1' bit value at position nt−2=11 must be sign extended (see Table 8).

Figure 5:
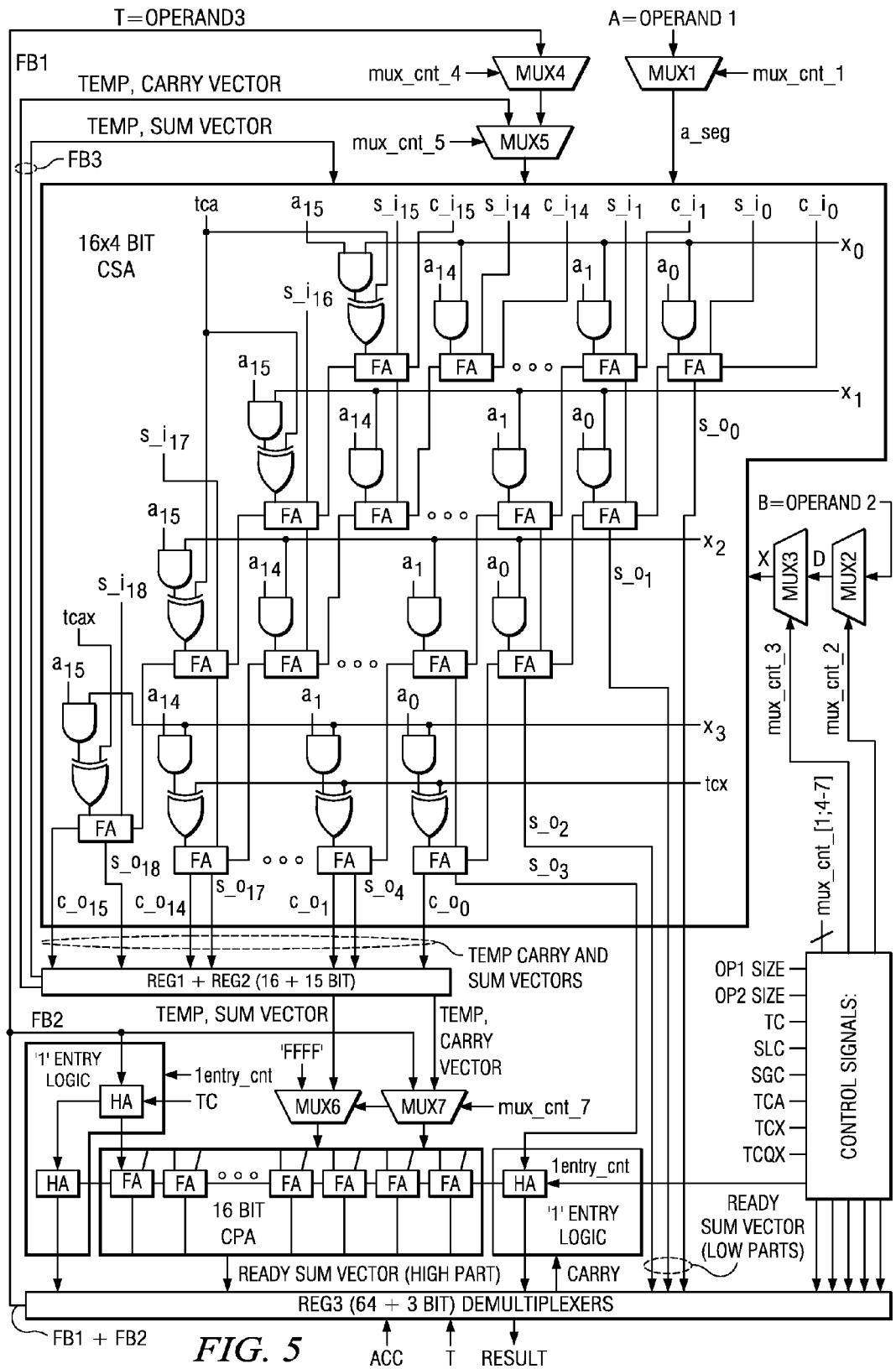
FIG. 5 is a multiplier and MAC unit according to the present invention.

FIG. 5 shows a simplified circuit and block diagram of a multiply and multiply and accumulate unit according to the present invention. The embodiment of the present invention shown in FIG. 5 includes a 16×4 bit CSA unit. This is a partially serialized multiply and MAC unit for operation of 16 bit operands and 32 bit operands, which can be selectively divided into segments of 16 bits. The 16 bit segments of the second operand are further divided into slices of 4 bits. The CSA unit includes a regular structure of full adder cells FA, which are arranged in rows and columns. A first operand a having a bit size na is passed through a first multiplexer MUX1 to the CSA unit. The multiplexer MUX1 selects segments a_seg of a bit length of na_seg of the first operand a which are to be processed by the CSA unit. In the present embodiment na_seg is equal to 16. A second operand b is passed through a second and a third multiplexer MUX2, MUX3 to the CSA unit. The second operand b is divided by multiplexer MUX2 into segments d each having a length of nd=16 bits. Further, MUX3 subdivides segments d into slices x having a bit width of nx=4.

The inputs $x_0$, $x_1$, $x_2$, $x_3$ to the CSA unit are the inputs of the slices of bit width nx of the second operand b. The first operand a is input as a whole or in segments a_seg at positions $a_0$ to $a_{15}$ in the CSA unit (i.e. na can be equal to na_seg). The single bit products are calculated by AND gates coupled to the full adders FA. Further, XOR gates are provided at the most significant positions of each row and for all full adders in the output row of the CSA unit for performing the selective inversions of single bit products. The XOR gates receive signals tcx, tca and tcax, respectively. All control signals tcx, tca, tcax, mux_cnt_1 to mux_cnt_7, and 1entry_cnt are generated by a control stage CNTL. The control signals are based on the first configuration signal tc, which indicates, whether a signed or an unsigned operation is to be performed, another configuration signal slc (slice count), indicating whether or not the last slice is processed and a configuration signal sgc (segment count), indicating the segment to be processed. The control stage CNTL also receives configuration signals OP1size, and OP2size. OP1size indicates the size of the first operand a, OP2size indicates the size of the second operand b.

The control signals mux_cnt_1 and mux_cnt_2 control MUX1 and MUX2 in order to select the respective segment. Accordingly, segments a_seg of a bit width of na_seg are provided at the output of multiplexer MUX1 and segments d of a bit width of nd are provided at the output of the second multiplexer MUX2. nd can be equal to nb and na_seg can be equal to na. The segments d of bit width nd are further partitioned by the third multiplexer MUX3, which is controlled by a control signal mux_cnt_3 controlling which slice x is to be processed.

The temporary carry and temporary sum vectors are output to a first and a second register REG1 and REG2. The contents of these first and second registers REG1 and REG2 can be fed back through a third feedback connection FB3 to the input of the CSA unit, which allows the CSA unit for one segment to be split into four slices.

Further, there is a second adder stage, implemented as a CPA unit, which includes sixteen full adders FA. The CPA unit receives the temporary sum vector and the temporary carry vector from the first register REG1, REG2 through multiplexers MUX6 and MUX7 in order to provide the intermediate or the intermediate partial product. For performing a signed operation of first and second operands of variable size, a "1" entry logic is provided, which is coupled to the full adder at the most significant position of the CPA unit and to the full adder at the least significant position of the CPA unit used for adding '1' bit values at positions 16 and 31 in case of a 16×16 bit operation, at positions 32 and 63 in case of a 32×32 bit operation, and at positions 15, 31 and 47 in case of 16×32 or 32×16 bit operation.

The first "1" entry logic, coupled to the carry input of the full adder FA at the least significant position of the CPA unit receives control signals 1entry_cnt, which are produced by the control stage CNTL. Control signals mux_cnt_7 and 1entry_cnt are also fed to multiplexer MUX7 and to the second "1" entry logic, which is coupled to the full adder FA at the most significant position of the CPA unit. The second "1" entry logic includes two half adders HA, which have outputs coupled to an input of the full adder at the most significant position of the CPA unit and an output coupled to the third register REG3. The third register REG3 can be used to store a third operand t, and the intermediate products or intermediate partial products and the final product.

The lower parts of the ready sum vector are passed directly from the CSA unit to the third register REG3. The higher parts of the ready sum vector are received from the CPA unit. A second feedback connection FB2 couples the third register REG3 back to the seventh multiplexer MUX7 in order to perform a sign extension with an intermediate partial product. Therefore, a "1" bit value vector "FFFF" can be fed to the CPA unit through multiplexer MUX6.

The contents of register REG3 can be fed back through a first feedback connection FB1 and fourth and fifth multiplexers MUX4 and MUX5 to the CSA unit in order to add the intermediate partial products to get an intermediate product and also to perform an accumulation of a third operand.

Multiplexers MUX4 and MUX5 receive respective control signals mux_cnt_4 and mux_cnt_5 for selecting the respective parts (segments) of the content of REG3 (i.e. either the third operand or intermediate partial products stored in REG3). The third operand t to be added to the product of the first operand and the second operand b for a MAC operation can initially be stored in REG3.

Preferably, the multiply or multiply and accumulate unit shown in FIG. 5 should be adapted to multiply signed and unsigned operands of selectable sizes, e.g. a 16×16 bit operation, a 16×32 bit operation, a 32×16 bit operation and a 32×32 bit operation. In this situation, a 16 bit part of the first or second operand is considered to be one segment. A 32 bit wide portion of an operand corresponds to two segments. A 32×16 bit operation must then be performed in two 16×16 bit operations. A 32×32 bit operation needs four 16×16 bit segment operations.

The control signals tca, tcx, and tcax used in the CSA unit are provided by the control stage CNTL and based on the configuration signals tc, slc and other signals indicating the operand size, the segment count sgc etc. The following Table 10 indicates the relationship:

TABLE 10

| signal | 16 × 16 bit operation | 32 × 16 bit operation | 16 × 32 bit operation | 32 × 32 bit operation |
|---|---|---|---|---|
| tca | tc = 1 | tc = 1 AND sgc = 1 (sgc = 1: OP1H is used) | tc = 1 | tc = 1 AND sgc = 1, 3 (sgc = 1: OP1H and O2L is used, sgc = 3: OP1H and OP2H is used) |
| tcx | tc = 1 AND last_slice = 1 | tc = 1 AND last_slice = 1 | tc = 1 AND sgc = 1 AND last_slice1 (sgc = 1: OP2H is used) | tc AND sgc = 1, 3 AND last_slice (sgc = 1: OP2H is used) |
| tcax | tc = 1 AND (last_slice = 0) | tc = 1 AND (sgc = 0) OR ((sgc = 1) AND (last_slice = 0)) (sgc = 0: OP1L) | tc = 1 AND sgc = 0 OR sgc = 1 AND last_slice = 0 | tc = 1 AND sgc = 3 AND last_slice = 0 or tc = 1 AND sgc = 1 or tc and sgc = 2 (sgc = 2: OP1L is used) and (OP2H is used)) |

OP1H is the higher significant segment of a first operand OP1 (e.g. operand a in the previous examples). OP1L is the lower significant segment of the first operand. OP2H and OP2L are the higher and lower significant segments of the second operand (i.e. the second operand b in the examples given hereinabove). tc=1 indicates a signed operation. tc=0 an unsigned operation. last_slice=1 indicates the computation of the last slice x(highest rank) of a segment of the second operand b and can be derived from the slice count signal slc. If last_slice=0, a lower significant (having lower rank) slice is processed, which is not the last slice. Dependent on the operand sizes, the value of the segment count signal sgc has different meanings, which are indicated in the relevant fields of the table. For example, for a 16×16bit operation (cf. second column of Table 10) the signal tca (shown in FIG. 5) is set to 1 if tc=1. For a 32×16bit operation (cf. the third column of Table 10) tca=1, if tc=1 and sgc=1 at the same time. sgc=1 means that the higher significant segment OP1H of the first operand is processed; otherwise tca=0.

Figure 6:
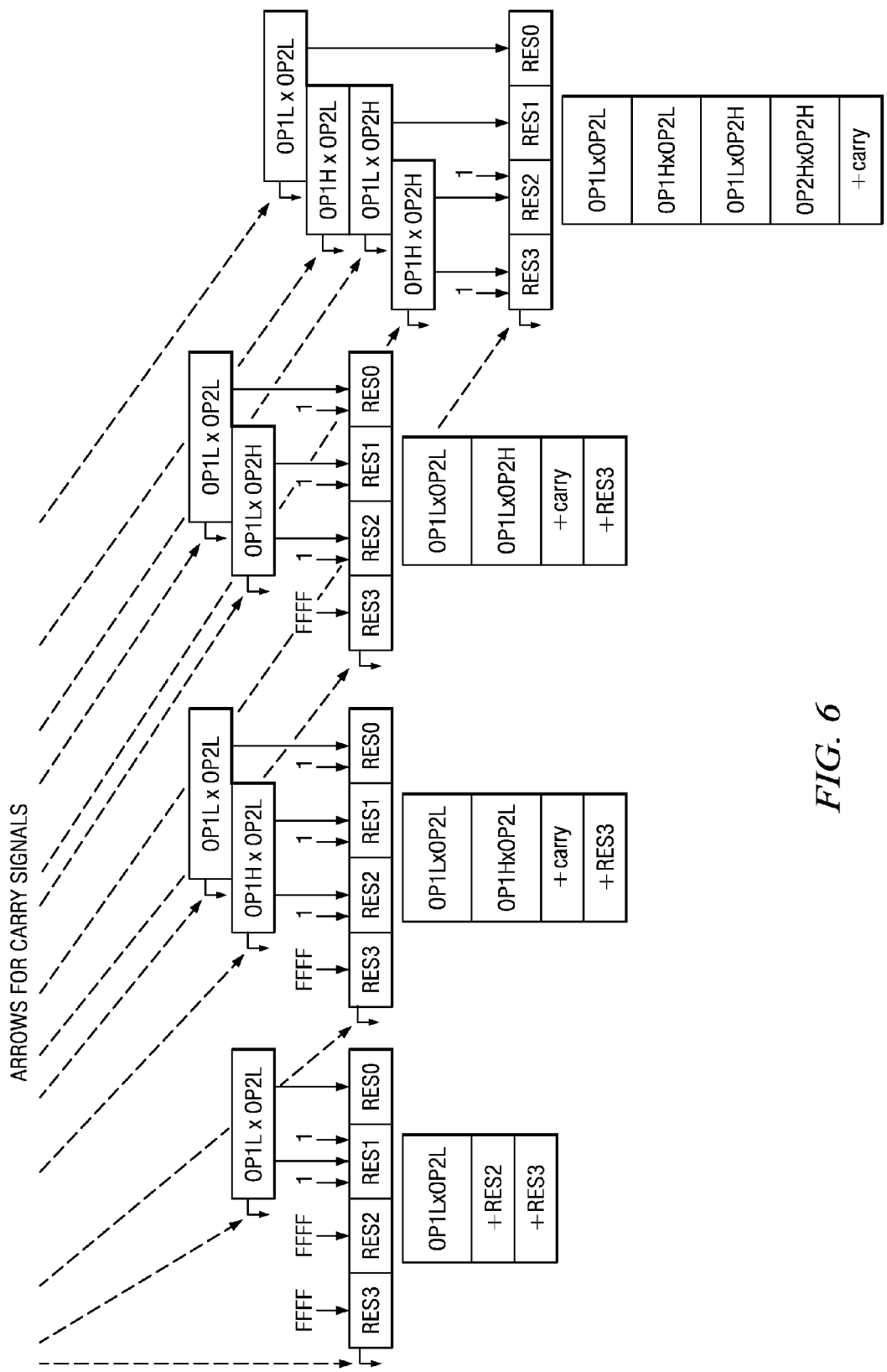
FIG. 6 is a diagram illustrating the cycles and steps to be carried out in accordance with the present invention.

FIG. 6 is a diagram illustrating the necessary segment-wise operations for different bit sizes. The partitioning of 16×16 bit, 32×16 bit, 16×32 bit and 32×32 bit signed multiply or multiply and accumulate operations into sequential 16×16 bit segments is shown. In all these operations, an additional accumulator is added to provide a 64 bit accumulation after the 16×16 bit, 32×16 bit, 16×32 bit or 32×32 bit multiplication. The first operand OP1 can consist of a lower significant segment OP1L and a higher significant segment OP1H and the second operand OP2 can consist of lower and higher segments OP2L and OP2H, respectively. A segment is 16 bit wide. The respective segment count signal sgc is also indicated in the same row with the corresponding operation. The segment count signal sgc is explained with respect to Table 10.

The result is split into four parts RES0, RES1, RES2 and RES3. In the left column of FIG. 6, a 16×16 bit operation is illustrated. Accordingly, OP1L is to be multiplied with OP2L. The first operand and the second operand are considered to include only the lower parts each consisting of 16 bit. The result is passed to RES1 and RES0. According to the modified Baugh Wooley algorithm, "1" bit values have to be added at positions 16 and 31 if signed operation is performed. The highest result bit of a partial 16×16 bit operation does not fit into the corresponding part of the result, but needs not be added as a carry signal to the next higher part of the result. This means that the MSB of OP1L times OP2L needs to be added to RES2. For a 32×16 bit or a 16×32 bit operation, it is necessary to add a "1" bit vector "FFFFh" to RES3, where h is for hexadecimal representation. For a 16×16 bit operation a corresponding vector of the length of 32 bit "FFFF FFFFh" value must be added to RES3 and RES2. This takes account of a signed operation, where the leading "1" bit value entries need to be sign extended to the complete 64 bit result bit width.

For the intermediate carry signals from a partial 16×16 bit operation to the next higher operation, the carry input of the completing CPA unit can be used, as shown in FIG. 5 by way of the "carry" signal from REG3 to the '1' entry logic of the CPA unit. Also the additional "1" bit value entries and the additional "FFFFh" vectors can be added by using the completing carry propagate adder of the 16×16 bit multiplier.

In some cases a carry signal from the previous 16×16 bit segment and a "1" entry (for a signed operation) need to be added at the same time. In this cases an additional 16 bit adder or an additional cycle using the 16 bit carry propagate adder needs to be used. This provides the additional carry cycles (+carry) shown in FIG. 6.

A 16×16 bit segment operation can be performed in parallel, but it can also be partially serialized to reduce the area of the circuit (for the cost of a higher number of clock cycles). For example a 16×16 bit multiply and/or MAC segment can be split into four 16×4 bit carry safe slices and an additional completing carry propagate adder. In this case a 16×16 bit segment needs 4+1 clock cycles. Since the carry propagate adder is not active during the first four carry cycles, it can already be used to add the "FFFF" vector to the higher parts of the 64 bit result in parallel. This saves an extra clock cycle for this operation.

In particular, the positions of the "1" bit values to be added to the partial intermediate products shown in FIG. 6, vary with respect to 16×16 bit, 32×16 bit, 16×32 bit or 32×32 bit operations. A 16×16 bit operation requires to add a "1" bit value at positions 16 and 31. However, for a 32×16 bit or 16×32 bit operation, "1" bit values have to be added at positions 15, 31 and 47, which corresponds to the most significant position of the 16 bit CPA unit during each cycle. For a 32×32 bit operation a "1" bit value is to be added to position 32 and to position 63, which is the least significant position of the 16 bit CPA unit and the most significant position of the CPA unit for RES2 and RES3.

The respective cycles, which are to be carried out for the different operand sizes are also illustrated in FIG. 6. Accordingly, a 16×16 bit operation requires a multiplication of OP1L and OP2L and adding of RES2 and RES3. A 32×16 bit operation requires calculating the products of OP1L and OP2L as well as OP1H and OP2L. These intermediate products have to be added and an additional carry cycle and the summation of RES3 is to be performed. Almost the same operations have to be carried out for a 16×32 bit operation, except that the intermediate products include OP1L times OP2L and OP1L times OP2H. For a 32×32 bit operation four intermediate products have to be calculated as indicated in FIG. 6 and an additional carry cycle must be spent.

While the foregoing is directed to embodiments of the present invention, other and further embodiments of the invention may be devised without departing from the basic scope thereof, and the scope thereof is determined by the claims that follow.

What is claimed:

1. A method for multiplying a signed first operand na bits and a signed second operand nb bits, wherein na and nb are different positive integer numbers, the method comprising:
   generating single bit products of pairs of a single bit from the signed first operand and a single bit from the signed second operand with a logical AND function implemented via corresponding AND gates to produce na times nb single bit products;
   selectively inverting for the signed first operand and the signed second operands the single bit products of the first operand bit na−1 multiplied with the second operand bits 0 to nb−2 implemented via corresponding XOR gates;
   selectively inverting the single bit products of the signed first operand bits 0 to na−2 multiplied with the signed second operand bit nb−1, implemented via corresponding XOR gates;
   adding the single bit products in accordance with their respective order for producing an intermediate product after both the steps of selectively inverting; and
   adding a '1' bit value at bit positions nb−1, na−1 and na+nb−1 for receiving a final product.

2. The method of claim 1 further comprising adding a third operand (t) to the intermediate product, wherein the third operand has a bit size of nt bits, and sign extending the '1' bit value at position na+nb−1 if nt is greater than na+nb−1.

3. The method of claim 1, further comprising:
   selecting at least one of a segment of the signed first operand or the signed second operand; and
   calculating an intermediate partial product on the selected segment and an operand or on two segments from both operands, wherein the '1' bit values are added to the intermediate partial products at respective positions corresponding to positions nb−1, na−1 and na+nb−1 of the intermediate product.

4. The method of claim 1, comprising:
   selecting smaller slices of a segment of an operand or of an operand; and
   performing the steps of single bit multiplying, inverting and adding of the single bit products on a slice and a segment or a slice and an operand.

* * * * *